Patented Feb. 21, 1950

2,498,199

UNITED STATES PATENT OFFICE 2,498,199

LOW MELTING FLUX

Harold Hutchin Block, Los Angeles, Calif., assignor to The Garrett Corporation, Los Angeles, Calif., a corporation of California No Drawing. Application December 3, 1945, Serial No. 632,588

10 Claims. (Cl. 148—26)

This invention relates to the production and use of new and improved fluxes for metallic joining processes and in particular to the type of fluxes employed in the brazing of light metal alloys, such as alloys of aluminum and magnesium.

In the brazing of such metals it is desirable to operate at as low a temperature as possible so as not to affect the structure of the metallic pieces being joined. Thus, for example, if the brazing temperature reaches the incipient melting point of the metal alloy, chemical or physical change in the metallic structure may occur. Accordingly, brazing alloys and associated fluxes are employed which melt or fuse at considerably less than this incipient melting temperature of the alloys being joined. However, the fusion temperature of such a flux or alloy is not necessarily the temperature at which the metals can be brazed inasmuch as a thorough cleaning or removal of the oxide film from the metal surface is a necessary prerequisite. This ability of the flux to clean is generally referred to as its reactivity and represents the actual minimum operating temperature at which the flux is effective.

Accordingly, it is a purpose of the present invention to provide metallic fluxes and especially aluminum and magnesium brazing fluxes which may be used at lower temperatures than hitherto attainable.

The present invention is based upon the discovery that a very small amount of a hydride or halide of silicon when incorporated in conventional brazing fluxes promotes the reactivity of the flux at a much lower temperature than hitherto attained. Such silicon compounds preferably are free of oxygen, contain no other metallic ingredient, and may contain both hydrogen and halide.

Illustrative examples of applicable silicon compounds are as follows: bromo silicane $SiH_3Br$, bromo trichloro silicane $SiBrCl_3$, chloro silicane $SiH_3Cl$, dibromo silicane $SiH_2Br_2$, dibromo dichloro silicane $SiBr_2Cl_2$, dichloro silicane $SiH_2Cl_2$, tribromo silicane $SiHBr_3$, tribromo chloro silicane $SiBr_3Cl$, trichloro silicane $SiHCl_3$, trichloro iodo silicane $SiCl_3I$, trifluoro silicane $SiHF_3$, triiodo silicane $SiHI_3$, disilicon hexabromide $Si_2Br_6$, silicon tetrabromide $SiBr_4$, disilicon hexachloride $Si_2Cl_6$, silicon tetrachloride $SiCl_4$, silicon tetrafluoride $SiF_4$, silicane $SiH_4$, disilicane $Si_2H_6$, trisilicane $Si_3H_8$, tetrasilicane $Si_4H_{10}$, silicon tetraiodide $SiI_4$, disilicon tetraiodide $Si_2I_4$ and disilicon hexaiodide $Si_2I_6$. Silicon halides containing sulphur may also be applicable such as silicon sulphide dibromide $SiSBr_2$, silicon sulphide dichloride $SiSCl_2$, and silicon trichloride hydrosulphide $SiCl_3HS$.

A general characteristic of these silicon compounds is that they are volatile at fluxing temperatures, and under fluxing conditions, probably liberate hydrogen, hydrogen halide, or (in the case of the sulphide) hydrogen sulphide. While the heated metal parts to be brazed may be cleaned by direct application of such gaseous silicon compounds, for ease in handling, it has been found convenient to incorporate such compounds in the flux. This is done by making an aqueous slurry with the silicon compound or compounds and the dry salt of the metallic flux. Although I prefer to make up such flux mixture with only the quantity necessary for immediate use, I have found that such slurries after standing for a period of several weeks are still effective.

Only a small amount of the silicon compound need be added to the flux—for example an amount on the order of 1% although as much as 2% or 3% or even 5% may be incorporated since any excess has no ill effect and will be volatilized as the flux is heated toward the brazing temperature. However, although all of these silicon compounds volatilize much below this brazing temperature an amount probably on the order of $\frac{1}{10}$% is held in the flux by some chemical or physical forces, and is not driven off until the brazing temperature is approached, at which time it appears that the hydrogen or halide of the compound is liberated. This point may be observed by the emission of acidic fumes from the flux, apparently indicating the decomposition of the absorbed silicon compounds. In this connection a particular advantage of the present compound is that any silicon thus incorporated into the weld or into the metal being joined does not deleteriously affect its properties, but contributes toward corrosion resistance of the alloy in contrast to the action of halides of such other metals as zinc, tin, or lead.

The invention may be further illustrated by its application to aluminum brazing fluxes. These fluxes are generally mixtures of metallic halides based principally upon the potassium chloride-lithium chloride eutectic, to which chlorides are added minor amounts of other alkali or alkaline earth halides or of halides of the metal being brazed (particularly aluminum). One such flux has the composition 46% potassium chloride, 37% lithium chloride, 5% sodium chloride, 2% strontium chloride and 10% cryolite. This mixture of dry salt was ground together and an aqueous slurry made with 2% silicon tetrachloride based upon the weight of the dry salt. It was found that this flux produced an excellent cleaning action so that brazing could be carried out efficiently at as low a temperature as 900° F. The flux was useful in both torch and furnace brazing.

In torch brazing the metallic filler rod is first dipped in a slurry of the flux, then applied to the joint, or the rod may be precoated with a baked-on covering of the flux. In lieu of this, the joint itself may be painted with a flux slurry.

Furnace brazing may be accomplished in several different ways. For example, the joint and/or the filler brazing alloy may be coated with flux, assembled and placed in the furnace. Alternatively, the faying surfaces of the joint may be coated or "tinned" with the brazing alloy, painted with flux, assembled and placed in the furnace.

A flux containing the silicon halides or hydrides and the metallic fluorides will exhibit a cleaning action over a much wider range of temperature than when either of these ingredients is employed alone, and such a flux is, therefore, adapted to high-temperature use, as well as for relatively low temperatures. In this connection, for example, it has been found advantageous to simultaneously incorporate a small amount, on the order of 5% to 14%, of cryolite or other alkali metal fluoride in the flux, since such fluorides provide the necessary cleaning action for the flux at relatively higher temperatures, for example, in the range 1030° F. to 1200° F.

While particular attention has been devoted herein to the application of the present silicon compounds in aluminum or magnesium brazing fluxes, the utilization of readily vaporizable substances, either alone or incorporated in fluxes, is also indicated in general for cleaning metal surfaces in preparation for soldering, autogenous welding or other treatment.

While the present invention has been illustrated from time to time with specific proportions and particular chemical compounds, it is to be understood that these are not given by way of limitation but that it is my intention to claim the invention broadly both as to composition and process, and limited only by the prior art, it being manifest that numerous variations may be made in mode of operation and in the composition and proportion of ingredients by those skilled in the art without departing from the spirit and scope of the present discovery as defined in the appended claims.

I claim as my invention:

1. In the brazing of light metal alloys, the improvement comprising cleaning the surface to be brazed by applying thereto a brazing flux consisting essentially of alkali metal halides and alkaline earth metal halides in which has been incorporated a substance selected from the group consisting of silicon halides and silicon hydrides, and heating the flux covered surface.

2. In the brazing of light metal alloys, the improvement comprising cleaning the surface to be brazed by applying thereto a brazing flux consisting essentially of alkali metal halides and alkaline earth metal halides in which has been incorporated a silicon halide, and heating the flux-covered surface.

3. In the brazing of light metal alloys, the improvement comprising cleaning the surface to be brazed by applying thereto a brazing flux consisting essentially of alkali metal halides and alkaline earth metal halides in which has been incorporated a silicon polyhalide, and heating the flux covered surface.

4. In the brazing of light metal alloys, the improvement comprising cleaning the surface to be brazed by applying thereto a brazing flux consisting essentially of alkali metal halides and alkaline earth metal halides in which has been incorporated a silicon tetrahalide, and heating the flux covered surface.

5. In the brazing of light metal alloys, the improvement comprising cleaning the surface to be brazed by applying thereto a brazing flux consisting essentially of alkali metal halides and alkaline earth metal halides in which has been incorporated a silicon chloride, and heating the flux covered surface.

6. In the brazing of light metal alloys, the improvement comprising cleaning the surface to be brazed by applying thereto a brazing flux consisting essentially of alkali metal halides and alkaline earth metal halides in which has been incorporated silicon tetrachloride, and heating the flux covered surface.

7. A flux consisting essentially of alkali metal halides and alkaline earth metal halides in which has been incorporated silicon tetrachloride in amount sufficient to produce an acidic vapor upon heating the flux above the volatilization temperature of said silicon tetrachloride.

8. In the process of brazing light metals such as aluminum and magnesium and their alloys at temperatures below the melting points of such metals, the step of cleaning the surfaces of such metals by coating such surfaces with a flux comprising an aqueous slurry of potassium chloride, lithium chloride, sodium chloride, strontium chloride and cryolite, and containing not more than about 5% by weight of silicon tetrachloride and heating the coated surfaces at a brazing temperature.

9. The process of brazing light metals such as aluminum and magnesium and their alloys which comprises mixing not more than about 5% of a compound of silicon selected from the group consisting of silicon hydrides and silicon halides with a brazing flux comprising essentially alkali metal halides and alkaline earth metal halides thereby increasing the reactivity of the flux, applying the mixture to the surfaces of the parts to be joined and brazing them at a brazing temperature below the melting point of the metal.

10. The process of claim 9 further characterized in that the silicon halide is silicon tetrachloride.

HAROLD HUTCHIN BLOCK.

REFERENCES CITED

The following references are of record in the file of this patent:

UNITED STATES PATENTS

| Number | Name | Date |
|---|---|---|
| 2,194,200 | Cohn | May 19, 1940 |
| 2,211,448 | Vaughn et al. | Aug. 13, 1940 |
| 2,277,064 | Bialosky et al. | Mar. 24, 1942 |
| 2,357,125 | Miller | Aug. 29, 1944 |

FOREIGN PATENTS

| Number | Country | Date |
|---|---|---|
| 170,343 | Great Britain | Oct. 10, 1921 |